United States Patent
Tseng et al.

(10) Patent No.: US 12,008,150 B2
(45) Date of Patent: Jun. 11, 2024

(54) ENCRYPTED DATA PROCESSING DESIGN INCLUDING CLEARTEXT REGISTER FILES

(71) Applicant: International Business Machines Corporation, Armonk, NY (US)

(72) Inventors: Jessica Hui-Chun Tseng, Fremont, CA (US); Jose E. Moreira, Irvington, NY (US); Pratap C. Pattnaik, Yorktown Heights, NY (US); Manoj Kumar, Yorktown Heights, NY (US); Kattamuri Ekanadham, Mohegan Lake, NY (US); Gianfranco Bilardi, Padua (IT)

(73) Assignee: International Business Machines Corporation, Armonk, NY (US)

( * ) Notice: Subject to any disclaimer, the term of this patent is extended or adjusted under 35 U.S.C. 154(b) by 39 days.

(21) Appl. No.: 17/356,784

(22) Filed: Jun. 24, 2021

(65) Prior Publication Data

US 2022/0414270 A1    Dec. 29, 2022

(51) Int. Cl.
*G06F 21/79* (2013.01)
*G06F 21/10* (2013.01)
*G06F 21/54* (2013.01)
*G06F 21/60* (2013.01)
*G06F 21/74* (2013.01)

(52) U.S. Cl.
CPC .............. *G06F 21/79* (2013.01); *G06F 21/54* (2013.01); *G06F 21/602* (2013.01); *G06F 21/74* (2013.01); *G06F 21/107* (2023.08)

(58) Field of Classification Search
CPC ........ G06F 21/79; G06F 21/54; G06F 21/602; G06F 21/74; G06F 2221/0751
See application file for complete search history.

(56) References Cited

U.S. PATENT DOCUMENTS

| | | |
|---|---|---|
| 4,941,176 A | 7/1990 | Matyas |
| 5,295,188 A | 3/1994 | Wilson |
| 5,799,088 A | 8/1998 | Raike |
| 6,920,562 B1 | 7/2005 | Kerr |
| 7,885,405 B1 | 2/2011 | Bong |
| 8,356,185 B2 | 1/2013 | Olson et al. |
| 8,417,961 B2 | 4/2013 | Olson et al. |

(Continued)

FOREIGN PATENT DOCUMENTS

EP    1082722 B1    3/2001

OTHER PUBLICATIONS

Wikipedia, "Classic RISC pipeline", From Wikipedia, the free encyclopedia, last edited on Mar. 17, 2021, printed May 4, 2021, 7 pages, <https://en.wikipedia.org/wiki/Classic_RISC_pipeline>.

(Continued)

*Primary Examiner* — Jung W Kim
*Assistant Examiner* — Alan Lingqian Kong
(74) *Attorney, Agent, or Firm* — James L. Olsen

(57) ABSTRACT

Aspects of the present disclosure relate to encrypted data processing (EDAP). Encrypted data from a cache to be loaded into a register file can be accessed. The encrypted data can be decrypted to receive cleartext data. The cleartext data can be written to the register file. The cleartext data can be processed using at least one functional unit to receive cleartext computation results. The cleartext computation results can then be written back to the register file.

15 Claims, 6 Drawing Sheets

(56) References Cited

U.S. PATENT DOCUMENTS

| | | | |
|---|---|---|---|
| 8,654,970 | B2 | 2/2014 | Olson et al. |
| 9,317,286 | B2 | 4/2016 | Olson et al. |
| 10,007,808 | B2 | 6/2018 | Boivie et al. |
| 10,454,903 | B2 | 10/2019 | Neal |
| 10,671,764 | B2 | 6/2020 | Auh |
| 2001/0018736 | A1* | 8/2001 | Hashimoto .............. G06F 21/72 713/1 |
| 2002/0051536 | A1* | 5/2002 | Shirakawa .............. G06F 21/71 380/45 |
| 2002/0181709 | A1 | 12/2002 | Sorimachi |
| 2004/0143748 | A1* | 7/2004 | Yamaguchi ......... G06F 12/0802 713/193 |
| 2004/0146158 | A1 | 7/2004 | Park |
| 2013/0275766 | A1* | 10/2013 | Plainecassagne ..... G06F 21/123 713/189 |
| 2015/0058997 | A1* | 2/2015 | Lee ..................... G06F 9/45558 726/26 |
| 2016/0170769 | A1* | 6/2016 | LeMay ............... G06F 9/30054 713/190 |
| 2019/0132120 | A1 | 5/2019 | Zhang |
| 2019/0325147 | A1 | 10/2019 | Lu |
| 2020/0125501 | A1 | 4/2020 | Durham |
| 2020/0125769 | A1* | 4/2020 | Kounavis ................. G06F 21/78 |
| 2021/0042114 | A1* | 2/2021 | Mansell .............. G06F 9/30185 |
| 2021/0150069 | A1 | 5/2021 | Elenes |
| 2021/0218547 | A1 | 7/2021 | Weiler |

OTHER PUBLICATIONS

Sinharoy et al., "IBM POWER8 Processor Core Microarchitecture", Ibm Journal of Research and Development, Jan. 2015, 22 pages.

Lee et al., "Inferring Fine-Grained Control Flow Inside SFX Enclaves with Branch Shadowing", Nov. 25, 2016, 19 pages.

Sloss et al., "Designing and Optimizing System Software", ARM System Deceloper's Guide, 2004, 703 pages.

Anonymous, "Power-Efficient Processing of Applications Involving Regular Access and Processing Patterns", An ip.com Prior Art Database Technical Disclosure, ip.com No. IPCOM000244280D, ip.com Electronic Publication Date: Nov. 30, 2015, 3 pages.

Anonymous, "Application Protection Inside an Untrusted OS", An ip.com Prior Art Database Technical Disclosure, Original Publication Date: Feb. 9, 2010, ip.com No. IPCOM000193066D, 7 pages.

Anonymous, "A Method of Register Renaming for a Merged Register File Sharing Different Data Types", An ip.com Prior Art Database Technical Disclosure, Original Publication Date: Feb. 4, 2008, ip.com No. IPCOM000167251D, 4 pages.

Suh et al., "Secure Program Execution via Dynamic Information Flow Tracking", ASPLOS XI: Proceedings of the 11th international conference on Architectural support for programming languages and operating systems, Oct. 9-13, 2004, 12 pages.

Oracle, "The Fully Encrypted Data Center", Encrypting Your Data Center on Oracle's SPARC Servers, Oracle Technical White Paper, Jun. 2016, 22 pages.

Whitworth, M., "Data at Rest Encryption and Key Management in GDPR", IDC Analyze the Future, Jun. 2018, 7 pages.

Smith et al., "How Practical is Computable Encryption", MITRE Innovation Program, 2013, 61 pages.

Anonymous, "Method of Shared Lock with Combined Password and Encryption", An ip.com Prior Art Database Technical Disclosure, ip.com No. IPCOM000251450D, ip.com Electronic Publication Date: Nov. 2, 2017, 5 pages.

Anonymous, "Autonomous Cell-Level Database Encryption and Authentication", An ip.com Prior Art Database Technical Disclosure, Original Publication Date: Jun. 6, 2007, ip.com No. IPCOM000153678D, 10 pages.

Mell et al., "The NIST Definition of Cloud Computing", Recommendations of the National Institute of Standards and Technology, Sep. 2011, 7 pages.

Kumar et al., "Encrypted Data Processing Design Including Local Buffers", U.S. Appl. No. 17/356,752, filed Jun. 24, 2021.

IBM, List of IBM Patents or Patent Applications Treated as Related, Jun. 22, 2021, 2 pages.

"Notification of Transmittal of the International Search Report and the Written Opinion of the International Searching Authority, or the Declaration", Patent Cooperation Treaty, Applicant's or agent's file reference: F22W2139, International application No. PCT/CN2022/095159, International filing date: May 26, 2022, Date of mailing: Jul. 27, 2022, 10 pgs.

Wang, et al., "Implementing and Optimizing and Encryption Filesystem on Android," 2012 IEEE 13th International Conference on Mobile Data Management, 2012, pp. 52-62.

* cited by examiner

ENCRYPTED DATA PROCESSING DESIGN INCLUDING CLEARTEXT REGISTER FILES

BACKGROUND

The present disclosure relates generally to the field of computing, and in particular, to encrypted data processing (EDAP).

To protect data within processors, an encrypted data processing (EDAP) design ensures data is encrypted throughout a processing pipeline of the system. Only the authorized application has access to the cleartext data. Other software, including system software, executing on processors implementing EDAP designs are not able to access any cleartext data. The data is decrypted when it enters functional units for execution and the computation result is re-encrypted before being written back to the register file.

SUMMARY

Embodiments of the present disclosure include a method and computer program product for encrypted data processing. Encrypted data from a cache to be loaded into a register file can be accessed. The encrypted data can be decrypted to receive cleartext data. The cleartext data can be written to the register file. The cleartext data can be processed using at least one functional unit to receive cleartext computation results. The cleartext computation results can then be written back to the register file.

Embodiments of the present disclosure further include a processor for encrypted data processing. The processor can include a cache configured to store ciphertext data. The processor can further include a register file configured to store cleartext data. The processor can further include functional units configured to process the cleartext data from the register file. The processor can include an encryption unit configured to decrypt ciphertext data from the cache into cleartext to be loaded into the register file and further configured to encrypt data from the register file into ciphertext to be stored into the cache.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
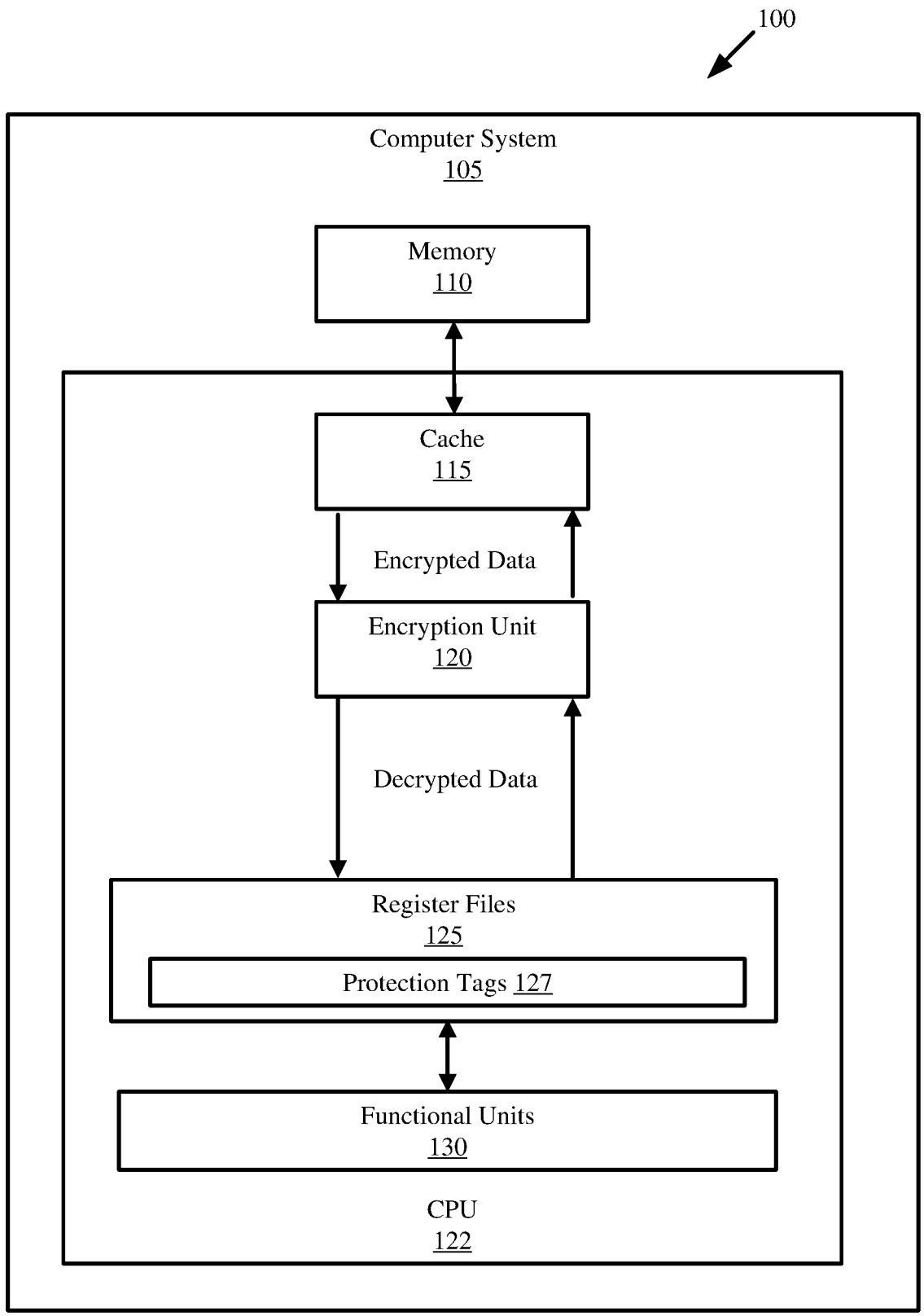
FIG. 1 is a block diagram illustrating an example computing environment in which illustrative embodiments of the present disclosure can be implemented.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of computing, and in particular, to encrypted data processing (EDAP). While the present disclosure is not necessarily limited to such applications, various aspects of the disclosure can be appreciated through a discussion of various examples using this context.

To protect data within processors, an encrypted data processing (EDAP) design ensures data is encrypted throughout a processing pipeline of the system. Unauthorized software executing on processors implementing EDAP designs are not able to access any cleartext data. The data is decrypted when it enters functional units for execution and the computation result is re-encrypted before being written back to the register file. However, decrypting and encrypting data of each instruction adds cycle time to overall execution and can significantly slow down overall performance of the system. There is a need to maintain security within an EDAP design while improving performance of the underlying computer system.

Aspects of the present disclosure relate to encrypted data processing. Encrypted data from a cache to be loaded into a register entry can be accessed. The encrypted data can be decrypted to receive cleartext data. The cleartext data can be written to the register entry. The cleartext data can be processed using at least one functional unit to receive cleartext computation results. The cleartext computation results can then be written back to the register entry. In embodiments, the cleartext computation results can be accessed within the register entry, the cleartext computation results can be encrypted to receive ciphertext computation results, and the ciphertext computation results can be stored to the cache.

Aspects of the present disclosure further include a processor for encrypted data processing. The processor can include a cache configured to store ciphertext data. The processor can further include a register file configured to store cleartext data. The processor can further include functional units configured to process the cleartext data from the register file. The processor can include an encryption unit configured to decrypt ciphertext data from the cache into cleartext to be loaded into the register file and further configured to encrypt data from the register file into ciphertext to be stored into the cache.

Turning now to the figures, FIG. 1 is a block diagram illustrating an example computing environment 100 in which illustrative embodiments of the present disclosure can be implemented. The computing environment 100 includes a computer system 105. The computer system 105 includes memory 110 and a central processing unit (CPU) 122. The CPU 122 includes a cache 115, an encryption unit 120, register files 125, and functional units 130.

Figure 2:
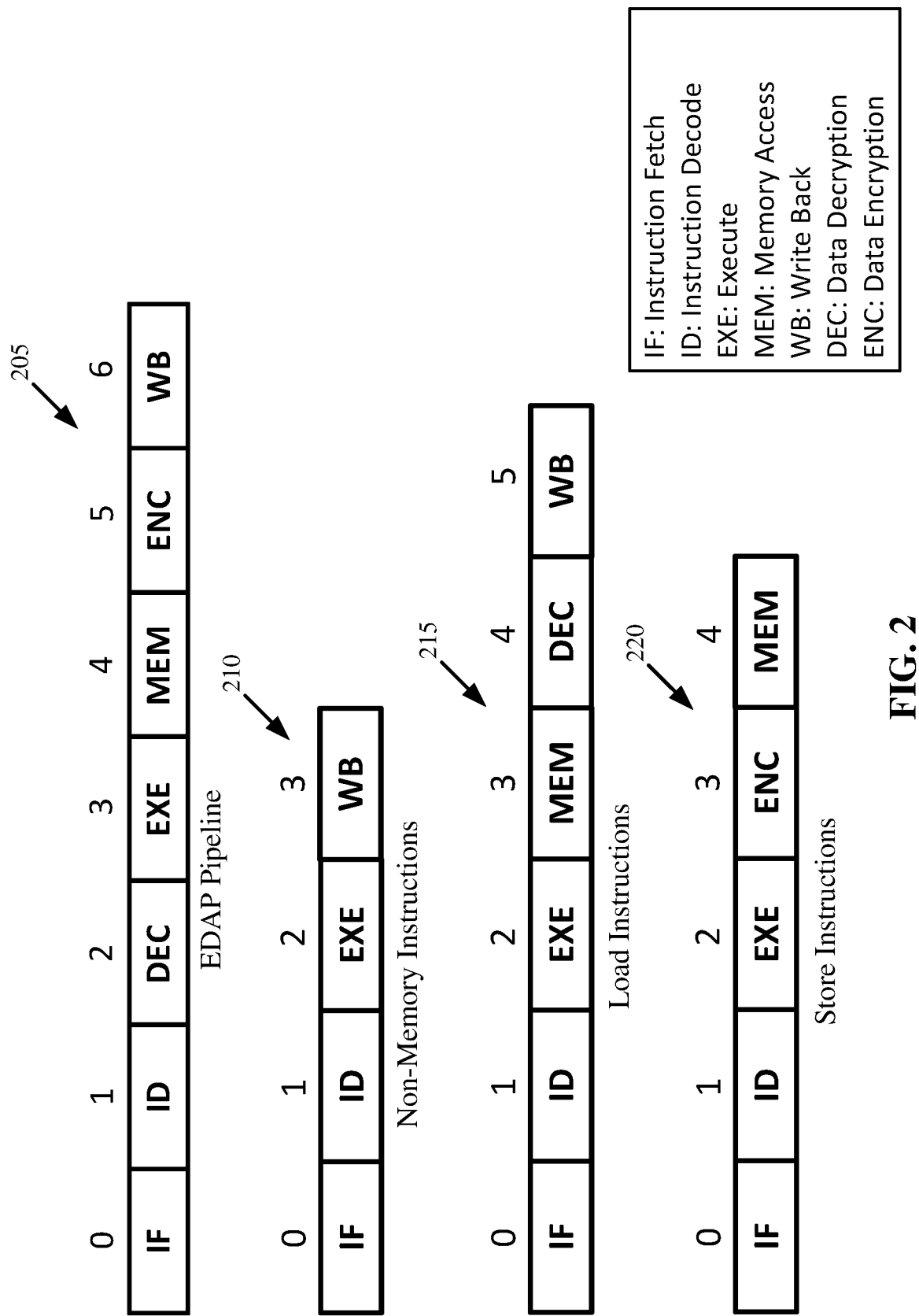
FIG. 2 is a diagram illustrating instruction pipelines for data processing, in accordance with embodiments of the present disclosure.

The computer system 105 can be configured to execute instructions issued by software. In particular, the CPU 122 can be configured to fetch instructions (e.g., from cache 115), decode instructions, execute instructions (e.g., using functional unit 130), access memory, and writeback computations to register files 125 (a collection of registers). In embodiments, the CPU 122 can be configured in an EDAP design, such that the data may be protected prior to the execution stage (e.g., data is encrypted and not accessible to software). Thus, data can be decrypted prior to execution, and re-encrypted after memory access such that encrypted data is stored during writeback. However, encrypting and decrypting data for each instruction can add cycle time and negatively impact performance of the computer system 105. For example, decryption and encryption stages of processing data can each take 15 processor cycles or more. EDAP pipeline 205 of FIG. 2 depicts an EDAP processing pipeline. "DEC" and "ENC" depict data decryption and data encryption stages within the pipeline.

As such, aspects of the present disclosure decouple the traditional EDAP processing pipeline by enabling storage of cleartext data (e.g., decrypted data) within register files 125. By storing cleartext data within register files 125 accessible only to functional units 130, processing time associated with decrypting and encrypting data each time a register is accessed by an instruction can be bypassed. For example, if a given register entry within register files 125 stores cleartext data for processing and is required to be accessed by an instruction (e.g., based on a register address), cycle time associated with retrieving the data from the register can be reduced as decryption of the data is not necessary. Further, upon computation of results by functional units 130, the results can be written back to the register file 125 without having to encrypt the data. As such, significant energy and time savings can be achieved (e.g., 30 cycles or more can be saved from bypassing decryption and encryption). In this example, security can be maintained as the cleartext data is only accessible to functional units 130 required to execute the instruction and the cleartext data is encrypted before being transmitted back to cache 115.

However, in conventional EDAP processing, the functional units 130 would be required to decrypt data retrieved from register files 125 and thereafter re-encrypt the data after result computations are made. This increases the amount of processing time and energy used to execute the instruction. Therefore, there are significant advantages to storing cleartext data within register files 125 while maintaining data in an encrypted state within cache 115 and memory 110.

Referring to FIG. 2, new pipelines for data processing (except EDAP pipeline 205, which depicts conventional EDAP processing) based on cleartext data being stored in register files 125 are introduced, in accordance with embodiments of the present disclosure. As discussed above, EDAP Pipeline 205 depicts conventional EDAP processing steps required to execute an instruction. In EDAP Pipeline 205, because data stored in registers is always encrypted, any time registers are accessed for processing decryption is required to be performed prior to execution and results of execution are required to be re-encrypted before being written back to registers.

In accordance with aspects of the present disclosure implementing register files 125 storing cleartext, for non-memory instructions 210, only instruction fetch, instruction decode, execution, and writeback steps are completed. This is because the data stored within registers is cleartext and thus decryption prior to execution and re-encryption prior to writeback to the register file are not required to be completed. "Non-memory instructions 210" refer to instructions in which only data in register files 125 is required to be accessed (e.g., encrypted data stored in cache 115 is not required for the instruction).

For load instructions 215, only instruction fetch, instruction decode, execution, memory access, decryption, and writeback steps are completed. This is because data within the cache 115 (e.g., originating from memory 110) is encrypted and thus to load the data to register files 125, decryption of the data is completed. As such, "load instructions 215" refer to instructions which access encrypted data in cache 115 which is required to be loaded into register files 125 in cleartext. Prior to loading into register files 125 (e.g., prior to writeback), the data can be decrypted such that it is stored within register files 125 in cleartext.

For store instructions 220, only instruction fetch, instruction decode, execution, encryption, and memory access steps are completed. This is because data within the register files 125 is stored within cleartext and thus to store data to cache 115 (and ultimately memory 110), encryption of data is completed. As such, "store instructions 220" refer to instructions which access cleartext data within register files 125 which is required to be stored in cache 115 in ciphertext. Prior to storing data in cache 115 (e.g., prior to memory access), the data can be encrypted such that it is stored within cache 115 in ciphertext.

Referring back to FIG. 1, reference is now made to data indicators that may be used to enable proper data processing within computing environment 100. In embodiments, each register entry (not shown) within register files 125 includes a protection tag 127. Protection tags 127 can indicate whether data is protected by EDAP (e.g., as opposed to data which does not require protection, such as certain metadata) and thus needs to be encrypted before being written back to cache 115. As such, if a given register entry has a protection tag set to on, the cleartext data within that register entry can only be accessed under the user mode and is required to be encrypted before being stored in cache 115. In contrast, if a protection tag for a given register entry is set to off, the data within that register entry is not protected by EDAP and thus does not have to be encrypted before being stored in cache 115. In embodiments, a protection tag can be a bit set within a register entry indicating whether or not the data is protected by EDAP.

Figure 4:
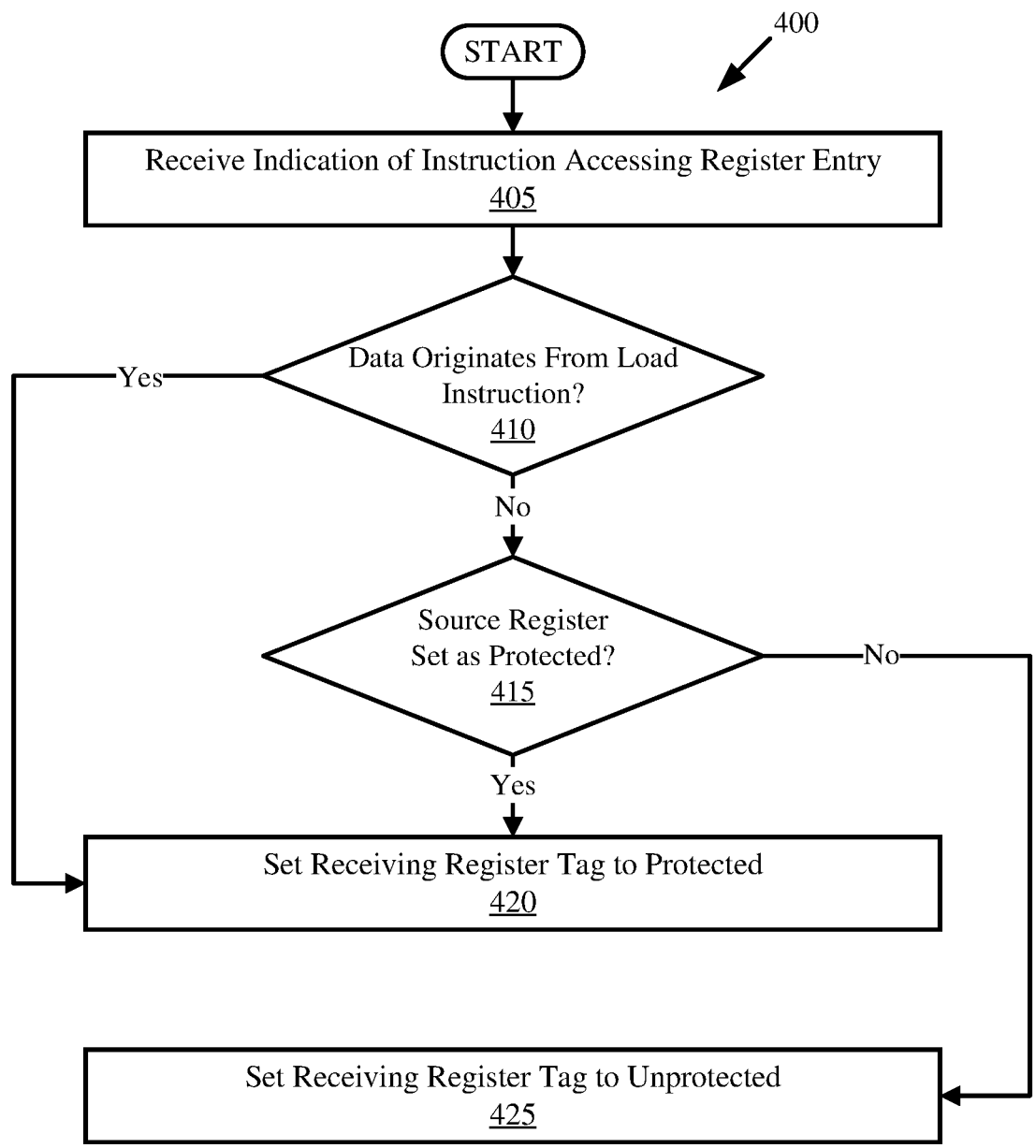
FIG. 4 is a flow-diagram illustrating an example method for setting protection tags within cleartext register files, in accordance with embodiments of the present disclosure.

In embodiments, when a register entry is written by an instruction, the register entry's tag is set to on if either it is a load instruction 215 (e.g., indicating decryption of the data retrieved from cache 115 has been completed) or if the instruction's source register entry (e.g., originating register) protection tag is set to on (e.g., indicating the data came from a register entry storing cleartext that is protected by EDAP). In embodiments, protection tags can indicate whether data within register files 125 needs to be erased (or specially handled in accordance with method 500 of FIG. 5) at context switch such that other components such as a supervisor, hypervisor or operating system (O/S) cannot access the cleartext data. FIG. 4 depicts a flow-diagram for setting protection tags on register entries.

In embodiments, upon a context switch to a supervisor, hypervisor, or OS mode, the CPU 122 puts the hardware thread in a privileged mode (e.g., a non-user mode) and will not be able to access the protected cleartext registers. In embodiments, any register entries having protection tags set to on can be erased (e.g., via a store-and-clear processing) at the beginning phase of a context switch.

In embodiments, the encryption unit 120 can be configured to ensure only authorized applications have access to cleartext registers via encryption keys. For example, the encryption unit 120 can ensure only authorized applications possessing encryption keys can access cleartext data stored within register files 125. That is, encryption and decryption by the encryption unit 120 may only be completed by authorized software applications possessing a specific encryption key.

It is noted that FIG. 1 is intended to depict the representative major components of an example computing environment 100. In some embodiments, however, individual components can have greater or lesser complexity than as represented in FIG. 1, components other than or in addition to those shown in FIG. 1 can be present, and the number, type, and configuration of such components can vary. For example, cache 115 does not necessarily have to reside within CPU 122. In some embodiments, a portion of cache 115 may be included within CPU 122 and another portion of cache 115 may be included within memory 110.

Figure 3:
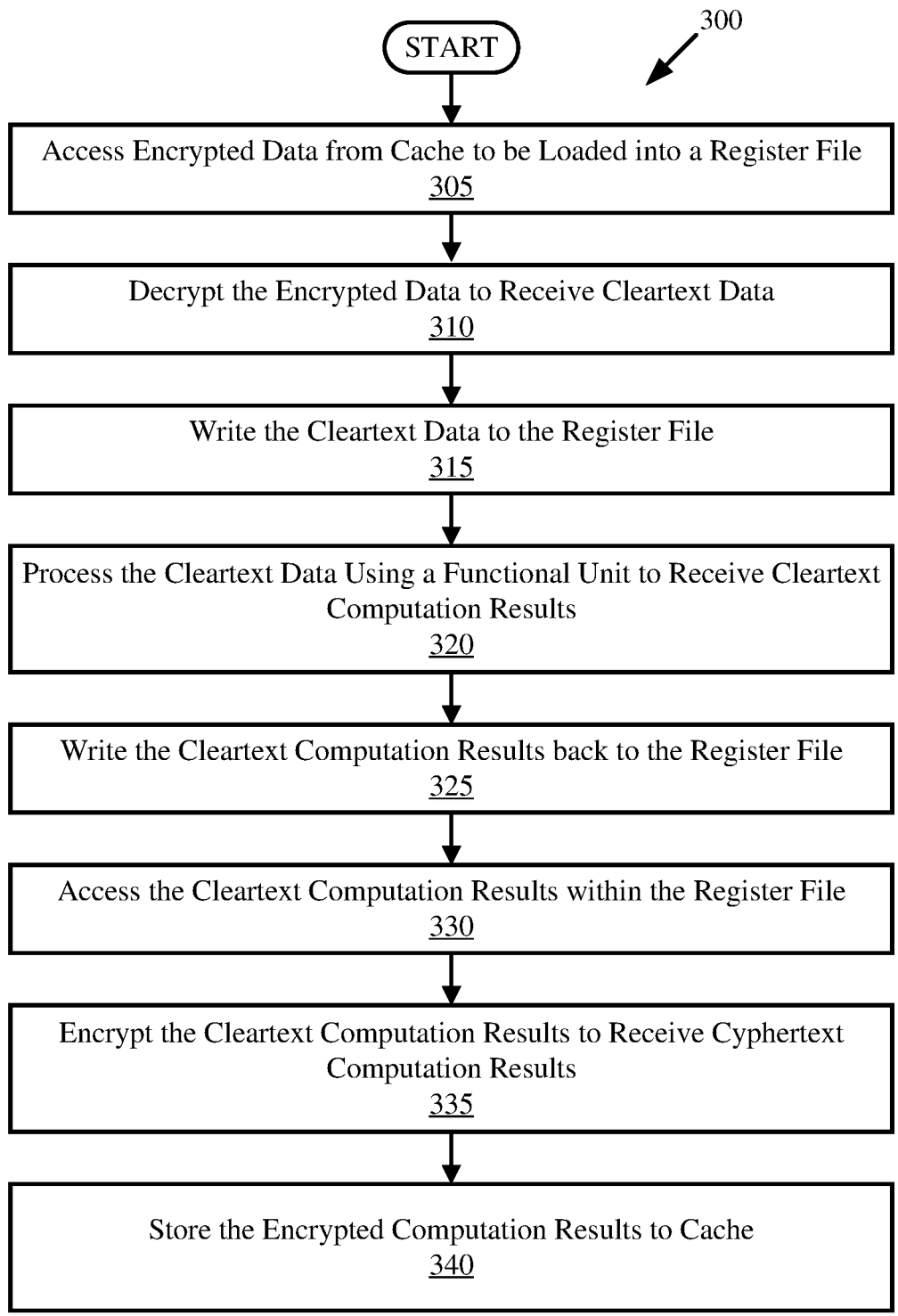
FIG. 3 is a flow-diagram illustrating an example method for data processing with cleartext register files, in accordance with embodiments of the present disclosure.

Referring now to FIG. 3, shown is a flow-diagram illustrating an example method 300 for processing data, in accordance with embodiments of the present disclosure.

Method 300 initiates at operation 305, where encrypted data to be loaded into a register (specified by an instruction) file is accessed from cache. The encrypted data is then decrypted (e.g., by encryption unit 120) to receive cleartext data. This is illustrated at operation 310. The cleartext data is then written to the register file. This is illustrated at operation 315. The cleartext data is then processed using at least one functional unit to receive cleartext computation results. This is illustrated at operation 320.

The cleartext computation results are then written back to the register file (e.g., or a single register entry). This is illustrated at operation 325. The cleartext computation results are then accessed within the register file. This is illustrated at operation 330. The cleartext computation results are then encrypted to receive ciphertext computation results. This is illustrated at operation 335. The ciphertext computation results are then stored to cache. This is illustrated at operation 340.

The aforementioned operations can be completed in any order and are not limited to those described. Additionally, some, all, or none of the aforementioned operations can be completed, while still remaining within the spirit and scope of the present disclosure.

Referring now to FIG. 4, shown is a flow-diagram illustrating an example method for setting protection tags within register entries, in accordance with embodiments of the present disclosure.

Method 400 initiates at operation 405, where an indication of an instruction accessing a register entry is received. A determination is made whether the data originates from a load instruction (e.g., load instruction 215 of FIG. 2). This is illustrated at operation 410. If a determination is made that the data does originate from a load instruction, then the receiving register tag is set to protected. This is illustrated at operation 420. This can be completed as if the load instruction is completed, the data is in cleartext (e.g., the data is decrypted as a part of the load instruction). Setting the register tag to protected can include setting a bit placeholder designated for the protection tag to on (e.g., a bit is set to 1 within the protection tag placeholder). If a determination is made that the data does not originate from a load instruction, then a determination is made whether the data originated from a source register with a protection tag set to on. This is illustrated at operation 415. This can be completed such that protection tags are propagated between registers storing cleartext data. If the data did originate from a source register with a protection tag set to on, then the receiving register tag is set to protected. This is illustrated at operation 420. If a determination is made that the data did not originate from a load instruction or a source register having a protection tag set to on, then the receiving register protection tag is set to off (e.g., unprotected). This is illustrated at operation 425.

The aforementioned operations can be completed in any order and are not limited to those described. Additionally, some, all, or none of the aforementioned operations can be completed, while still remaining within the spirit and scope of the present disclosure.

Figure 5:
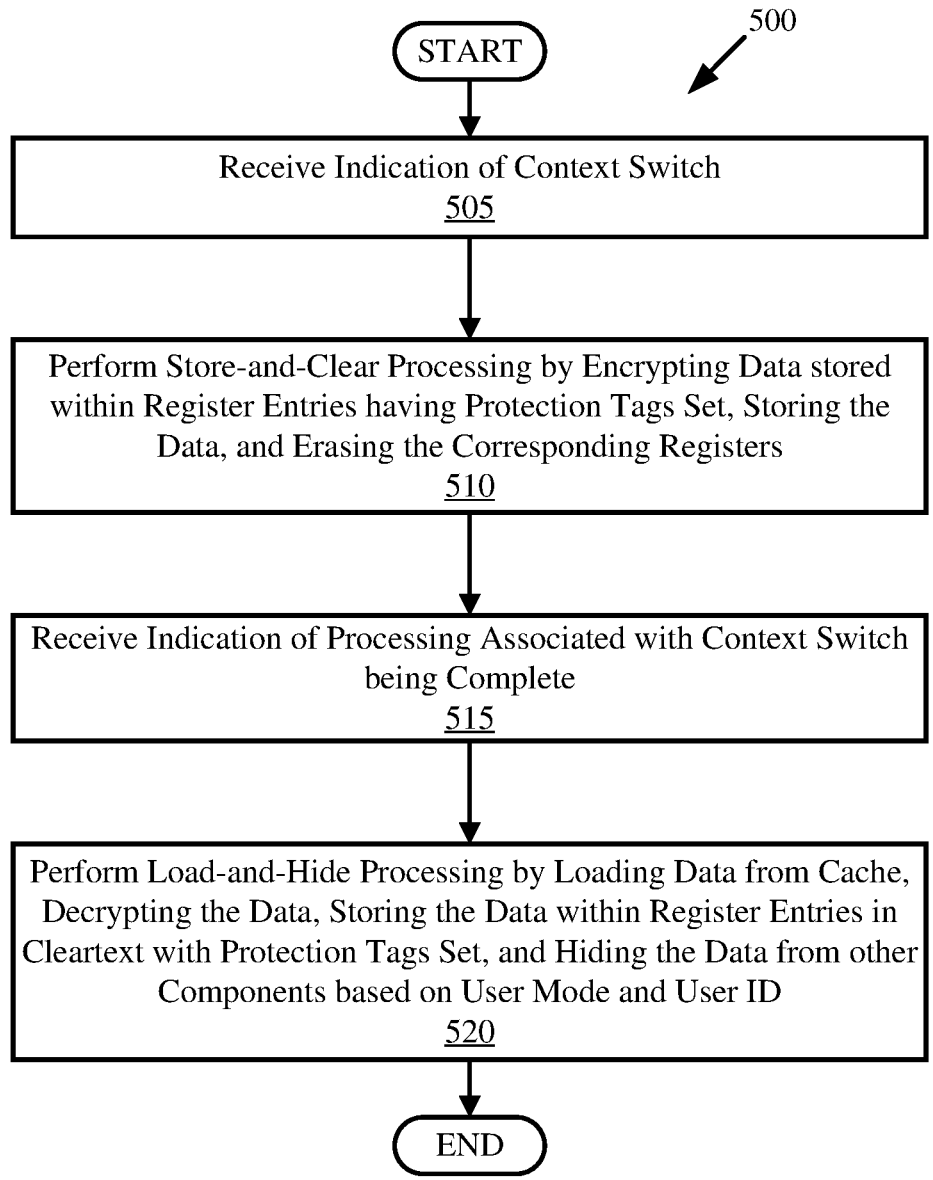
FIG. 5 is a flow-diagram illustrating an example method for protecting cleartext data within registers in response to a context switch, in accordance with embodiments of the present disclosure.

Referring now to FIG. 5, shown is a flow-diagram illustrating an example method for protecting cleartext data stored in registers in response to a context switch and restoring cleartext data (e.g., a thread state) back into the registers upon completion of processing associated with the context switch, in accordance with embodiments of the present disclosure.

Method 500 initiates at operation 505, where an indication of a context switch is received. A context switch is a process in which the state of a processor can be stored such that another task can be completed, and thereafter, the state of the process can be restored such that processing can resume. Context switching is a feature of multitasking operating systems allowing a single process to be shared by multiple processes.

In response to the indication of the context switch, a store-and-clear processing is performed. This is illustrated at operation 510. Store-and-clear processing is performed to protect cleartext data within registers upon access by other components (e.g., supervisor, hypervisors or operation systems) or processes. Store-and-clear processing includes first encrypting data stored within register entries having protection tags set to on. Thereafter, the data can be stored on cache (e.g., cache 115) or memory (e.g., memory 110). Thereafter, data within the corresponding registers (e.g., registers having the protection tag set to on) is erased.

An indication of processing associated with the context switch being complete is received. This is illustrated at operation 515.

In response to the indication of processing associated with the context switch being complete, a load-and-hide processing can be completed. This is illustrated at operation 520. Load-and-hide processing can include loading (e.g., retrieving) data from cache or other memory, decrypting the data (e.g., using encryption unit 120) to receive cleartext, and storing the data within appropriate register entries with protection tags set to on. In embodiments, the data can be hidden from other components or processes based on a current operating mode (e.g., user mode) and a user ID (e.g., encryption key) associated with the data.

The aforementioned operations can be completed in any order and are not limited to those described. Additionally, some, all, or none of the aforementioned operations can be completed, while still remaining within the spirit and scope of the present disclosure.

Figure 6:
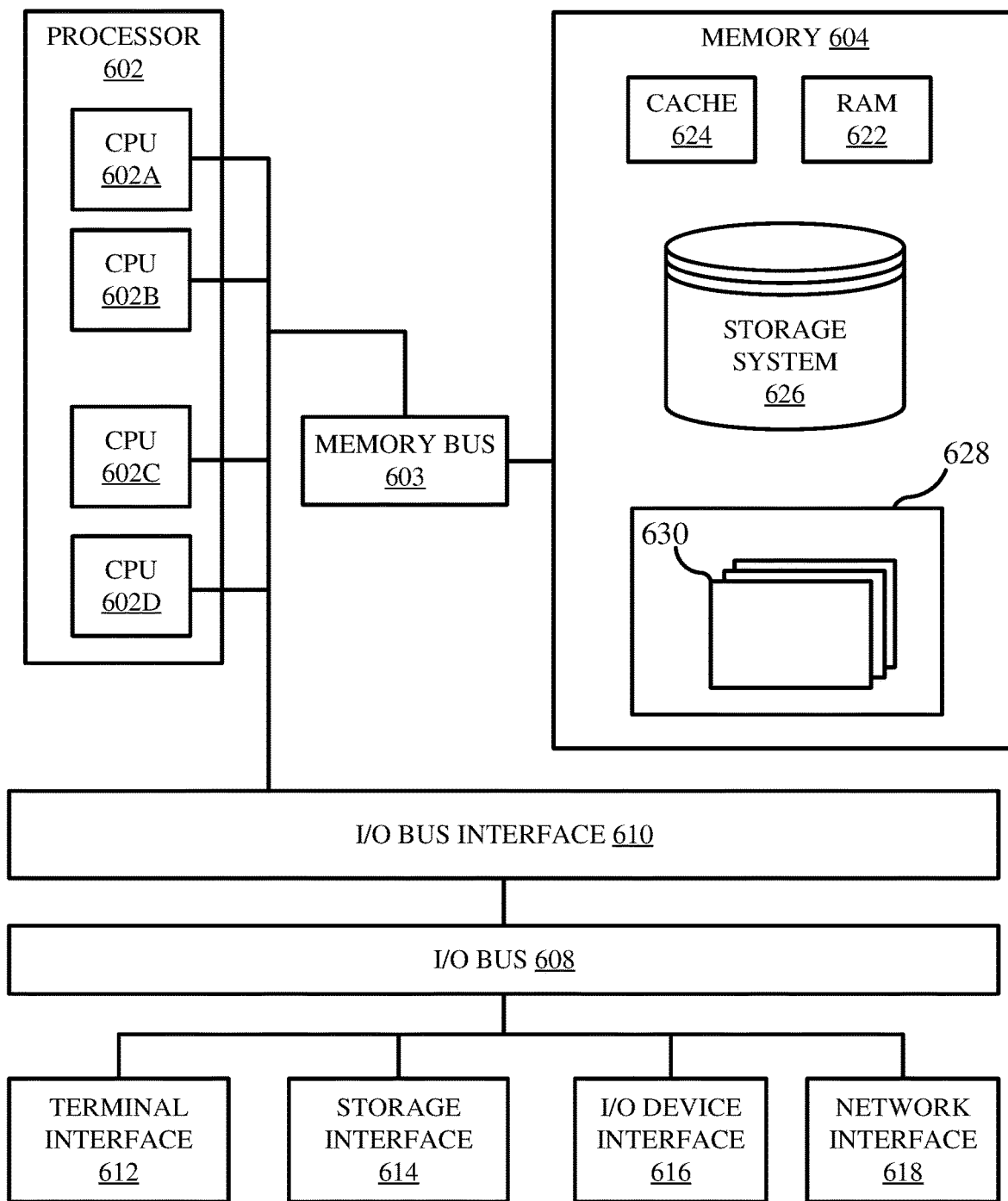
FIG. 6 is a high-level block diagram illustrating an example computer system that may be used in implementing one or more of the methods, tools, and modules, and any related functions, described herein, in accordance with embodiments of the present disclosure.

Referring now to FIG. 6, shown is a high-level block diagram of an example computer system 601 (e.g., computer system 105) that may be used in implementing one or more of the methods, tools, and modules, and any related functions, described herein (e.g., using one or more processor circuits or computer processors of the computer), in accordance with embodiments of the present disclosure. In some embodiments, the major components of the computer system 601 may comprise one or more CPUs 602 (e.g., CPU 122), a memory subsystem 604 (e.g., memory 110), a terminal interface 612, a storage interface 614, an I/O (Input/Output) device interface 616, and a network interface 618, all of which may be communicatively coupled, directly or indirectly, for inter-component communication via a memory bus 603, an I/O bus 608, and an I/O bus interface unit 610.

The computer system 601 may contain one or more general-purpose programmable central processing units (CPUs) 602A, 602B, 602C, and 602D, herein generically referred to as the CPU 602. In some embodiments, the computer system 601 may contain multiple processors typical of a relatively large system; however, in other embodiments the computer system 601 may alternatively be a single CPU system. Each CPU 602 may execute instructions stored in the memory subsystem 604 and may include one or more levels of on-board cache.

System memory 604 may include computer system readable media in the form of volatile memory, such as random access memory (RAM) 622 or cache memory 624 (e.g., cache 115, which may or may not be included in CPU 602). Computer system 601 may further include other removable/non-removable, volatile/non-volatile computer system storage media. By way of example only, storage system 626 can be provided for reading from and writing to a non-removable, non-volatile magnetic media, such as a "hard-drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 604 can include flash memory, e.g., a flash memory stick drive or a flash drive. Memory devices can be connected to memory bus 603 by one or more data media interfaces. The memory 604 may include at least one program product having a set (e.g., at least one) of program modules that are configured to carry out the functions of various embodiments.

One or more programs/utilities 628, each having at least one set of program modules 630 may be stored in memory 604. The programs/utilities 628 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 628 and/or program modules 630 generally perform the functions or methodologies of various embodiments.

Although the memory bus 603 is shown in FIG. 6 as a single bus structure providing a direct communication path among the CPUs 602, the memory subsystem 604, and the I/O bus interface 610, the memory bus 603 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 610 and the I/O bus 608 are shown as single respective units, the computer system 601 may, in some embodiments, contain multiple I/O bus interface units 610, multiple I/O buses 608, or both. Further, while multiple I/O interface units are shown, which separate the I/O bus 608 from various communications paths running to the various I/O devices, in other embodiments some or all of the I/O devices may be connected directly to one or more system I/O buses.

In some embodiments, the computer system 601 may be a multi-user mainframe computer system, a single-user system, or a server computer or similar device that has little or no direct user interface, but receives requests from other computer systems (clients). Further, in some embodiments, the computer system 601 may be implemented as a desktop computer, portable computer, laptop or notebook computer, tablet computer, pocket computer, telephone, smart phone, network switches or routers, or any other appropriate type of electronic device.

It is noted that FIG. 6 is intended to depict the representative major components of an exemplary computer system 601. In some embodiments, however, individual components may have greater or lesser complexity than as represented in FIG. 6, components other than or in addition to those shown in FIG. 6 may be present, and the number, type, and configuration of such components may vary.

As discussed in more detail herein, it is contemplated that some or all of the operations of some of the embodiments of methods described herein can be performed in alternative orders or may not be performed at all; furthermore, multiple operations can occur at the same time or as an internal part of a larger process.

The present disclosure can be a system, a method, and/or a computer program product. The computer program product can include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But, the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A method comprising:
   accessing, in response to a load instruction, encrypted data from a cache of a central processing unit (CPU) to be loaded into a register entry of a register file, the register file accessible by at least one functional unit of the CPU;
   setting, based on the accessing being responsive to the load instruction, a protection tag within the register entry to on by setting a bit placeholder associated with the protection tag to a first value, wherein protection tags are set to on for any register entries of the register file that are protected by encrypted data processing (EDAP) responsive to data of such register entries originating from load instructions;
   decrypting, in response to receiving an encryption key from an application authorized to access the encrypted data, the encrypted data to receive cleartext data;
   writing the cleartext data to the register entry, wherein the cleartext data written to the register entry is only accessible by the at least one functional unit during execution;
   processing the cleartext data using the at least one functional unit to receive cleartext computation results;
   writing the cleartext computation results back to the register entry;
   accessing the cleartext computation results within the register entry;
   encrypting, in response to receiving the encryption key from the application authorized to access the encrypted data, the cleartext computation results to receive ciphertext computation results; and
   storing the ciphertext computation results to the cache of the CPU.

2. The method of claim 1, wherein all register entries of the register file which include the protection tag set to on are erased in response to a context switch.

3. The method of claim 1, wherein the method further comprises:
   receiving an indication of a context switch; and
   performing a store-and-clear on a cleartext register entry of the register file by:
     encrypting data stored within the cleartext register entry to receive ciphertext;
     storing the ciphertext to the cache; and
     erasing the cleartext register entry.

4. The method of claim 3, wherein the method further comprises:
   receiving an indication that processing associated with the context switch is complete; and
   performing a load-and-hide processing on the ciphertext by:
     loading the ciphertext from the cache;
     decrypting the ciphertext to receive the data that was previously stored within the cleartext register entry; and
     storing the data back to the cleartext register entry with a protection tag set to on.

5. The method of claim 1, wherein the register file storing cleartext computation results is only accessible by the application having access to the encryption key used to encrypt and decrypt the data.

6. The method of claim 1, wherein the register file storing cleartext computation results is accessible by the application in a user-mode and not one selected from a group consisting of: a supervisor during a privileged mode, a hypervisor during a privileged mode, and an operating system (OS) during a privileged mode.

7. The method of claim 1, wherein the protection tag is set to on for a first register entry in response to determining that data of first register entry was received from a source register that has a protection tag set to on.

8. A processor comprising:
   a cache of a central processing unit (CPU) configured to store ciphertext data;
   a register file configured to store cleartext data, the register file accessible by functional units of the CPU, wherein protection tags are set to on for any register entries of the register file that are protected by encrypted data processing (EDAP) responsive to data of such register entries originating from load instructions, wherein the protection tags are set to on by setting bit placeholders associated with the protection tags in each respective register entry to a first value;
   functional units configured to process the cleartext data from the register file, wherein the cleartext data of the register file is only accessible by the functional units during execution; and
   an encryption unit configured to decrypt ciphertext data from the cache into cleartext to be loaded into the register file and further configured to encrypt cleartext computation results from the register file into ciphertext computation results to be stored into the cache upon execution by the functional units, wherein the register file storing cleartext data is only available to an authorized application having access to an encryption key used to encrypt and decrypt the data by the encryption unit.

9. The processor of claim 8, wherein register entries having the protection tag set to on are erased in response to a context switch.

10. The processor of claim 8, wherein in response to a context switch, a store-and-clear processing is performed on each register entry of the register file by:
    encrypting cleartext data within each register entry to receive ciphertext;
    storing the ciphertext to the cache; and
    erasing each register entry.

11. The processor of claim 10, wherein in response to processing associated with the context switch being complete, a load-and-hide processing is performed on each register entry to restore a thread state by:
    loading the ciphertext from cache;
    decrypting the ciphertext to receive the cleartext; and
    storing the cleartext back to each respective register entry with a protection tag set to on for each respective register entry.

12. A computer program product comprising one or more computer readable storage media, and program instructions collectively stored on the one or more computer readable storage media, the program instructions comprising instructions configured to cause one or more processors to perform a method comprising:
- accessing, in response to a load instruction, encrypted data from a cache of a central processing unit (CPU) to be loaded into a register entry of a register file, the register file accessible by at least one functional unit of the CPU;
- setting, based on the accessing being responsive to the load instruction, a protection tag within the register entry to on by setting a bit placeholder associated with the protection tag to a first value, wherein protection tags are set to on for any register entries of the register file that are protected by encrypted data processing (EDAP) responsive to data of such register entries originating from load instructions;
- decrypting, in response to receiving an encryption key from an application authorized to access the encrypted data, the encrypted data to receive cleartext data;
- writing the cleartext data to the register entry, wherein the cleartext data written to the register entry is only accessible by the at least one functional unit during execution;
- processing the cleartext data using the at least one functional unit to receive cleartext computation results;
- writing the cleartext computation results back to the register entry;
- accessing the cleartext computation results within the register entry;
- encrypting, in response to receiving the encryption key from the application authorized to access the encrypted data, the cleartext computation results to receive ciphertext computation results; and
- storing the ciphertext computation results to the cache of the CPU.

13. The computer program product of claim 12, wherein the method performed by the one or more processors further comprises:
- receiving an indication of a context switch; and
- performing a store-and-clear on a cleartext register entry of the register file by:
  - encrypting data stored within the cleartext register entry to receive ciphertext;
  - storing the ciphertext to the cache; and
  - erasing the cleartext register entry.

14. The computer program product of claim 13, wherein the one or more computer readable storage media store additional program instructions configured to cause the one or more processors to perform the method further comprising:
- receiving an indication that processing associated with the context switch is complete; and
- performing a load-and-hide processing on the ciphertext by:
  - loading the ciphertext from the cache;
  - decrypting the ciphertext to receive the data that was previously stored within the cleartext register entry; and
  - storing the data back to the cleartext register entry with a protection tag set to on.

15. The computer program product of claim 12, wherein the register file storing cleartext computation results is only available to the authorized application in a user-mode and not one selected from a group consisting of: a supervisor during a privileged mode, a hypervisor during a privileged mode, and an operating system (OS) during a privileged mode.

* * * * *